US012346953B2

(12) United States Patent
Licare (10) Patent No.: US 12,346,953 B2
(45) Date of Patent: Jul. 1, 2025

(54) GIFTING APPLICATION

(71) Applicant: Andrew Licare, Littleton, CO (US)

(72) Inventor: Andrew Licare, Littleton, CO (US)

(*) Notice: Subject to any disclaimer, the term of this patent is extended or adjusted under 35 U.S.C. 154(b) by 290 days.

(21) Appl. No.: 17/490,019

(22) Filed: Sep. 30, 2021

(65) Prior Publication Data

US 2022/0108378 A1     Apr. 7, 2022

Related U.S. Application Data (60) Provisional application No. 63/086,949, filed on Oct. 2, 2020.

(51) Int. Cl.
| | | |
|---|---|---|
| *G06Q 30/00* | (2023.01) | |
| *G06F 16/903* | (2019.01) | |
| *G06Q 30/0601* | (2023.01) | |
| *G06Q 50/00* | (2012.01) | |
| *H04L 9/40* | (2022.01) | |

(52) U.S. Cl.
CPC ... *G06Q 30/0633* (2013.01); *G06F 16/90335* (2019.01); *G06Q 30/0609* (2013.01); *G06Q 30/0623* (2013.01); *G06Q 30/0639* (2013.01); *G06Q 50/01* (2013.01); *H04L 63/0861* (2013.01)

(58) Field of Classification Search
CPC .......... G06Q 30/0633; G06Q 30/0609; G06Q 30/0623; G06Q 30/0639; G06Q 50/01; G06F 16/90335; H04L 63/0861
USPC ............................................... 705/26.1–27.2
See application file for complete search history.

(56) References Cited

U.S. PATENT DOCUMENTS

| | | |
|---|---|---|
| 7,496,527 B2 | 2/2009 | Silverstein et al. |
| 2016/0012514 A1 | 1/2016 | Brown |
| 2018/0150837 A1 | 5/2018 | Kirch et al. |
| 2019/0090003 A1 | 3/2019 | Hardy et al. |

(Continued)

FOREIGN PATENT DOCUMENTS

| | | |
|---|---|---|
| WO | 2013127716 A1 | 9/2013 |
| WO | 2015047549 A1 | 4/2015 |
| WO | 2015074118 A1 | 5/2015 |

OTHER PUBLICATIONS

D. Namiot and M. Sneps-Sneppe, "A new approach to advertising in social networks—business-centric check-ins," 2011 15th International Conference on Intelligence in Next Generation Networks, Berlin, Germany, 2011, pp. 92-96. (Year: 2011).*

*Primary Examiner* — Anand Loharikar
(74) *Attorney, Agent, or Firm* — Gearhart Law LLC (57) ABSTRACT

A method for providing a gift to a recipient at a merchant location is described. The method includes validating a gifter and a recipient as authorized users of a gifting engine, identifying a location of the recipient, comparing the location of the recipient to locations associated with merchant profiles in a database, identifying a match between the location of the recipient and a location of a merchant profile, and providing the gifter with a listing of services and/or products associated with the merchant profile and offered by a merchant. The method then includes receiving a selection of the gift from the listing of services and/or products associated with the merchant profile from the gifter, receiving a payment for the selected gift from the gifter, and providing the gift to the recipient while the recipient is physically present at the location.

13 Claims, 5 Drawing Sheets

(56) References Cited

U.S. PATENT DOCUMENTS

| | | |
|---|---|---|
| 2019/0213651 A1 | 7/2019 | Deluca et al. |
| 2021/0174339 A1* | 6/2021 | Isaacson ................ G06Q 20/34 |

* cited by examiner

GIFTING APPLICATION

CROSS-REFERENCE TO RELATED APPLICATIONS SECTION

This application is a U.S. Non-Provisional Patent Application that claims priority to U.S. Provisional Patent Application Ser. No. 63/086,949 filed on Oct. 2, 2020, the entire contents of which are hereby incorporated by reference in their entirety.

FIELD OF THE EMBODIMENTS

The field of the invention and its embodiments relate to an application executable on a computing device. In particular, the present invention relates to an application executable on a computing device that allows an individual (e.g., a gifter) or a group of individuals to surprise a recipient with a physical gift or a gift code while the recipient is at a merchant location.

BACKGROUND OF THE EMBODIMENTS

In today's fast-paced society, individuals typically purchase gifts online that are delivered to the recipients home address or send cash or an electronic gift card so that the recipient may purchase a gift of his/her choosing. As such, gift giving has become impersonal and rushed. If an individual wishes to purchase a beverage or a food item for someone else, the individual and the recipient must be physically present at a venue where the purchase transaction takes place. Therefore, the purchaser must be physically and temporally proximate to the target venue in order to purchase a beverage for someone at any given time.

As a solution to this problem, the individual may telephone or visit a venue, provide payment, and make an arrangement with staff at the venue for the recipient to claim the beverage or food item at a future date. This solution requires alerting the recipient of such gift and also providing the venue with enough detail to positively identify the recipient. This solution suffers from the amount of effort and time involved, as well as the uncertainty about properly informing the recipient.

In other examples, if the individual wishes to purchase a gift (such as a baked goods basket) for another, the individual can ship such gift to the individuals home address. However, this takes the surprise out of the transaction. Thus, a need exists for a gifting application where an individual (e.g., a gifter) or a group of individuals can surprise a recipient with a physical gift or a gift code while the recipient is at a merchant location.

Review of Related Technology

U.S. Pat. No. 7,496,527 B2 describes a system and method for enabling the remote purchasing of products or services (e.g., alcoholic beverages). As part of the buying transaction, the purchaser indicates a specific physical location where the product will be claimed, may identify a third party as the "recipient" of the product by providing the third-party's e-mail or text messaging address, can attach a personalized message to the transaction, and can specify the information required for recipients who are already known to the system to make an expedited return purchase in real or near-real time. In one aspect, a method of facilitating a third-party purchase includes the steps of: receiving, via a first communications device, an instruction from a purchaser to purchase at least one product or service for a prospective recipient at a venue designated to provide that product or service to the recipient in person and sending to the venue, via a second communications device, data identifying the at least the recipient and the product or service. The instruction may include data identifying the at least the recipient, the product or service, and the venue.

U.S. Published Patent Application No. 2016/0012514 A1 describes a method of gifting travel-related services to a traveler. The method includes: receiving trip data from a first user, transmitting the received trip data to a network server for displaying the trip data to a set of secondary users subscribed to access the network server, transmitting an access link to the network server to allow each of the set of secondary users to access a gifting interface, receiving a first request from at least one of the set of secondary users to access the gifting interface via the access link, generating a list of the travel-related services or products for display to the at least one of the set of secondary users, and gifting one or more of the travel-related services or products to the first user.

WO 2015/047549 A1 describes a computer-implemented method of purchasing an item and transmitting a message to a recipient of the item. The method entails: receiving location data about where the item can be picked up, obtaining a recipient address, receiving personal content for the recipient, and combining the location data with the personal content to create an electronic data package. The personal content may include one or more of an image, a written message, an audio segment, and a video segment. The electronic data package is transmitted to the recipient address. Optionally, the data in the data package (other than the location data) may be customized such that it is disclosed to a recipient at a pre-specified physical location.

U.S. Published Patent Application No. 2018/0150837 A1 describes a system and method to enable a gifter to surprise a recipient with a gift. The gifter, having access to certain information about the recipient, is able to set up a gift to the recipient via a gift web site, setting criteria for the gift. For example, the gifter may provide a gift for a predetermined amount that is redeemable at any merchant or merchant website. Alternatively, the gifter may provide a gift for a predetermined amount that may be redeemed only at a specific merchant or a specific merchant website. Still alternatively, the gifter may provide a gift the permits the intended gift recipient to purchase a predetermined number of items from any merchant or from a specific merchant. In this way the gifter provides a surprise gift to a gift recipient.

WO 2013/127716 A1 describes a social gift-giving system that is operable with a social networking service, such as Facebook. A graphical user interface (GUI) is provided on a display of a computing device. A user logs in to the social networking service. Responsive to selection of a first region of the GUI, the GUI displays a list of other users of the social networking service associated with the first user. These other users may be the first user's Facebook friends. Using the GUI, the user can select a Facebook friend, select a gift for the friend, and purchase the gift for the friend.

U.S. Published Patent Application No. 2019/0213651 A1 describes a cognitive online-gifting system that allows multiple users of an online community to jointly gift a recipient user. When community members post responses to an initial posting of the recipient user, the gifting system performs cognitive sentiment analyses to infer emotional subtext from the initial posting and from each responsive posting. The system chooses a gifting user and a set of candidate contributing users as functions of the inferred emotions. The gifting user selects a gift and the system solicits contributions toward the gift from the candidate contributors. The gift is then automatically delivered to the recipient user in the name of those candidates who agreed to contribute. If other users continue to post responses to the initial posting, they will be allowed to contribute to additional gifts in a similar manner.

U.S. Published Patent Application No. 2019/0090003 A1 pertains to gift-giving and video-dropping methods and systems. A gift drop or a video drop is facilitated using a mobile smart device and an interactive map. The system includes a gift or video drop database stored in a remote gift drop computer server. The system includes a gift or video drop logic section operable on a smart mobile device or a computer. The gift or video drop logic section includes an interactive gift or video drop map. The gift or video drop logic section presents the interactive gift or video drop map to a user, and facilitates the dropping of a symbolic gift item or a video onto the interactive map. The gift or video drop logic section determines whether the user is within certain predefined geographic boundaries, and either makes visible or gives a symbolic gift item to the user based on their location, or plays the video.

Various systems exist in the art. However, their means of operation are substantially different from the present disclosure, as the other inventions fail to solve all the problems taught by the present disclosure.

SUMMARY OF THE EMBODIMENTS

The present invention and its embodiments relate to an application executable on a computing device. In particular, the present invention relates to an application executable on a computing device that allows an individual (e.g., a gifter) or a group of individuals to surprise a recipient with a physical gift or a gift code while the recipient is at a merchant location.

A first embodiment of the present invention describes a method executed by a gifting engine on a first computing device associated with a gifter for providing a gift to a recipient at a merchant location. The gift is a physical object in some examples. In other examples, the gift is a gift code redeemable by the recipient when the recipient is physically present at the location.

The method includes numerous process steps, such as: receiving login credentials from a gifter associated with a first computing device. In response to querying a database comprising a plurality of merchant profiles, a plurality of gifter profiles, and a plurality of recipient profiles, the method further includes identifying a gifter profile of the plurality of gifter profiles associated with the login credentials and validating the gifter as an authorized user of the gifting engine. In other examples, in response to querying the database, the method may include failing to identify the gifter profile associated with the login credentials and prompting the gifter to create the gifter profile.

It should be appreciated that the merchant may be a retail store, a sporting arena or stadium, and/or a concert, among other examples not explicitly listed herein. The login credentials may include a username, a password, and/or a biometric identification means, among others. The biometric identification means is selected from the group consisting of: a fingerprint identification, a face recognition identification, a palm print identification, an iris recognition, and/or a retina recognition, among others.

The method also includes: receiving, from the gifter, an identity of a recipient associated with a second computing device. In response to querying the database, the method includes: identifying a recipient profile of the plurality of recipient profiles based on the identity of the recipient and validating the recipient as another authorized user of the gifting engine.

Moreover, the method includes identifying a location of the recipient. The location of the recipient is identified via global positioning system (GPS) tracking on the second computing device associated with the recipient. The method also includes comparing the location of the recipient to locations associated with each merchant profile of the plurality of merchant profiles and identifying a match between the location of the recipient and a location of a merchant profile of the plurality of merchant profiles.

The method then includes providing, via a graphical user interface of the first computing device, the gifter with a listing of services and/or products associated with the merchant profile and offered by a merchant. Next, the method includes: receiving, from the gifter, a selection of the gift from the listing of services and/or products associated with the merchant profile and receiving, from the gifter, a payment for the selected gift. The gift is then provided to the recipient while the recipient is physically present at the location.

Optionally, the method may include prompting the gifter to provide a message with the gift or attach an e-card to the gift and receiving the message or the e-card from the gifter to provide to the recipient with the gift. In this optional example, the method may further include providing the message and/or the e-card with the gift to the recipient. Further, a notification may optionally be provided via another GUI of the second computing device to the recipient.

In some examples, the first computing device further comprises a social media engine. In this example, the gifter comprises two or more individuals and the gift is a group gift for the recipient. The method may further include providing a notification to one or more mutual social media contacts via the social media engine regarding the group gift for the recipient and prompting the one or more mutual social media contacts to contribute to the group gift.

A second embodiment of the present invention describes a computer system. The computer system includes one or more processors, one or more memories, and one or more computer-readable hardware storage devices. The one or more computer-readable hardware storage devices contain program code executable by the one or more processors via the one or more memories to implement a method for providing a physical gift to a recipient at a merchant location.

The method includes numerous process steps, such as: receiving login credentials from a gifter, querying a database (that includes a plurality of merchant profiles, a plurality of gifter profiles, and a plurality of recipient profiles), identifying a gifter profile of the plurality of gifter profiles associated with the login credentials, and validating the gifter as an authorized user. The method further includes: receiving, from the gifter, an identity of a recipient, querying the database, identifying a recipient profile of the plurality of recipient profiles based on the identity of the recipient, and validating the recipient as another authorized user. The method may also include: identifying a location of the recipient via GPS tracking on the second computing device associated with the recipient, comparing the location of the recipient to locations associated with each merchant profile of the plurality of merchant profiles, and identifying a match between the location of the recipient and a location of a merchant profile of the plurality of merchant profiles.

Next, the method may include: providing the gifter with a listing of services and/or products associated with the merchant profile and offered by a merchant, receiving, from the gifter, a selection of the physical gift from the listing of services and/or products associated with the merchant profile, prompting the gifter to provide a message with the physical gift, receiving the message and a payment for the selected physical gift from the gifter, and providing the physical gift and the message to the recipient while the recipient is physically present at the location. Optionally, a notification regarding the gift may be provided to the recipient, where the notification includes a graphical notification, a video notification, a textual notification, an audio notification, and/or a tactile notification.

A third embodiment of the present invention describes a method executed by a gifting engine on a first computing device associated with a gifter for providing a gift to a recipient at a merchant location. The method includes numerous process steps, such as: receiving login credentials from a gifter associated with a first computing device, querying a database (that includes a plurality of merchant profiles, a plurality of gifter profiles, and a plurality of recipient profiles), identifying a gifter profile of the plurality of gifter profiles associated with the login credentials, and validating the gifter as an authorized user of the gifting engine. The method further includes: receiving, from the gifter, an identity of a recipient associated with a second computing device, querying the database, identifying a recipient profile of the plurality of recipient profiles based on the identity of the recipient, and validating the recipient as another authorized user of the gifting engine.

The method also includes: identifying a location of the recipient, comparing the location of the recipient to locations associated with each merchant profile of the plurality of merchant profiles, and identifying a match between the location of the recipient and a location of a merchant profile of the plurality of merchant profiles. Next, the method includes: providing, via the GUI of the first computing device, the gifter with a listing of services and/or products associated with the merchant profile and offered by a merchant and receiving, from the gifter, a selection of the physical gift from the listing of services and/or products associated with the merchant profile. The method then includes: prompting, via the GUI of the first computing device, the gifter to provide a message with the physical gift, receiving the message and a payment for the selected physical gift from the gifter, and providing the physical gift and the message to the recipient while the recipient is physically present at the location.

The first computing device also includes a social media engine. In this example, the gifter comprises two or more individuals and the gift is a group gift for the recipient. The method further includes: providing a notification to one or more mutual social media contacts via the social media engine regarding the group gift for the recipient and prompting the one or more mutual social media contacts to contribute to the group gift.

In general, the present invention succeeds in conferring the following benefits and objectives.

It is an object of the present invention to provide an application allowing an individual (e.g., a gifter) to surprise a recipient with a gift while the recipient is at a merchant location.

It is an object of the present invention to provide an application allowing an individual (e.g., a gifter) to surprise a recipient with a physical gift or a gift code while the recipient is at a merchant location.

It is an object of the present invention to provide an application that allows friends and family to connect in a way where they can send each other gifts and surprises at retail stores, sporting events, concerts, or other various establishments.

It is an object of the present invention to provide an application that allows individuals to contribute to a group gift for a recipient to be delivered to the while the recipient is at a merchant location.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
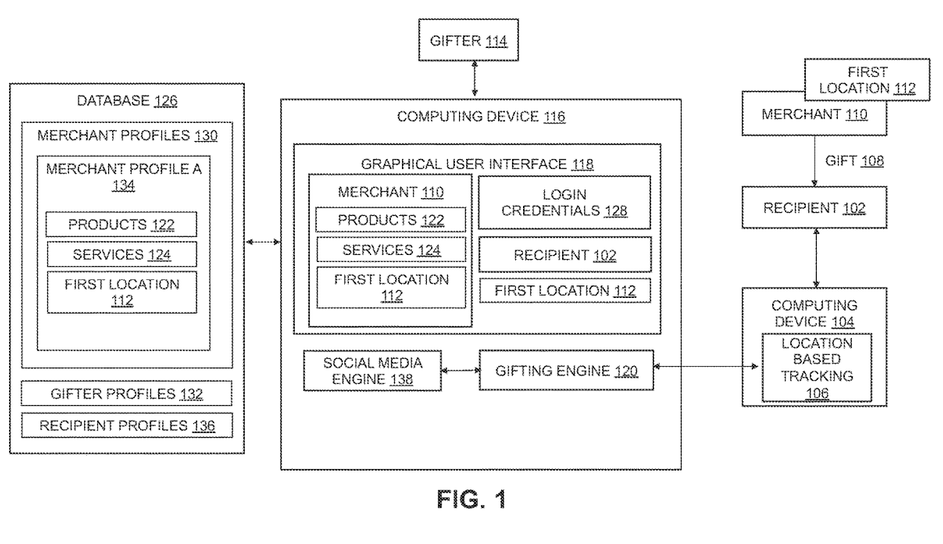
FIG. 1 depicts a block diagram of a system, in accordance with embodiments of the present invention.
Figure 2:
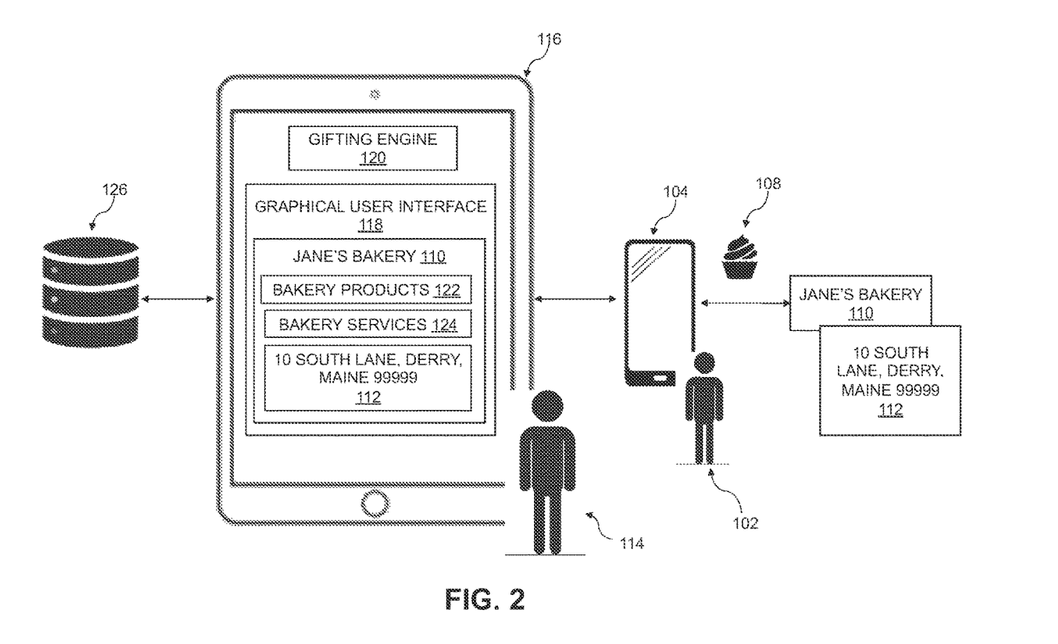
FIG. 2 depicts a schematic diagram of a system, in accordance with embodiments of the present invention.
Figure 3:
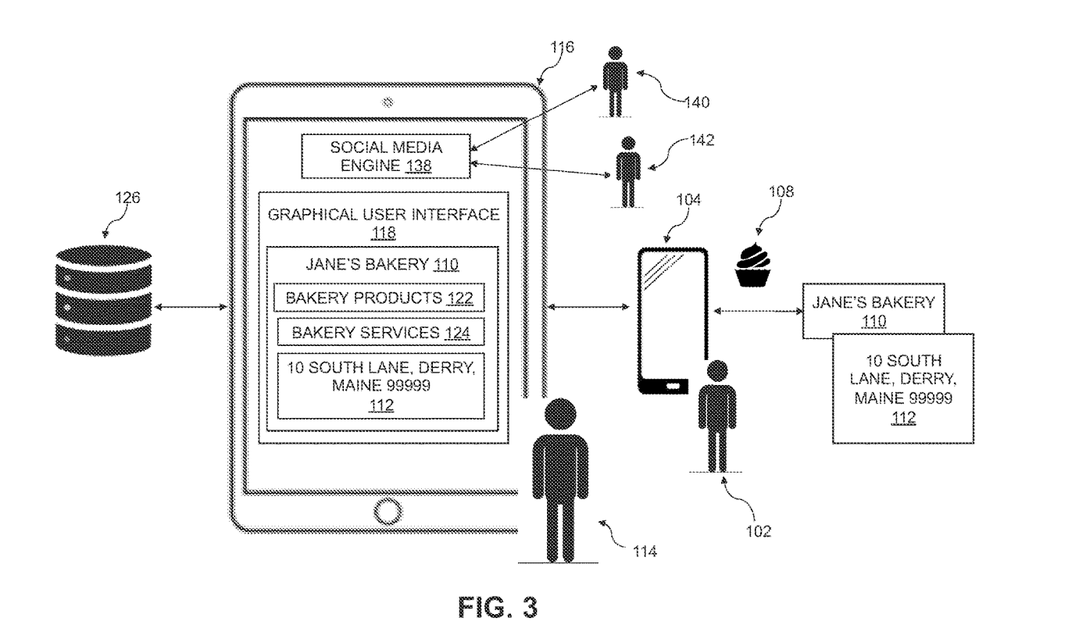
FIG. 3 depicts another schematic diagram of a system, in accordance with embodiments of the present invention.

A system is described in at least FIG. 1, FIG. 2, and FIG. 3 herein. The system includes a first computing device 116, a second computing device 104, and a database 126. A gifter 114 may be associated with the first computing device 116 and a recipient 102 of a gift 108 may be associated with the second computing device 104. It should be appreciated that each of the first computing device 116 and the second computing device 104 may be a computer, a laptop computer, a smartphone, and/or a tablet, among other examples not explicitly listed herein.

The first computing device 116 may include a graphical user interface (GUI) 118, a gifting engine 120 executable on the first computing device 116, and a social media engine 138 executable on the first computing device 116, among other components not explicitly listed herein. In other examples, each of the gifting engine 120 and the social media engine 138 may be applications, software program, services, or software platforms configured to be executable on the first computing device 116.

The gifting engine 120 may receive login credentials 128 from the gifter 114 via the GUI 118. The login credentials 128 may include a username, a password, and/or a biometric identification means, among other examples. The biometric identification means may include a fingerprint identification, a face recognition identification, a palm print identification, an iris recognition, and/or a retina recognition, among other examples not explicitly listed herein. Then, the gifting engine 120 may query the database 126. The database 126 may include merchant profiles 130, gifter profiles 132, and recipient profiles 136.

Each merchant may be an establishment selling a good or service. Examples of merchants may include retail stores, sporting arenas or stadiums, restaurants, bakeries, concerts, etc. Each of the merchant profiles 130, the gifter profiles 132, and the recipient profiles 136 may be distinguishable from other profiles by a unique identifier, such as a code, or other identifying information (e.g., name, address, telephone number, etc.). In some examples, each of the recipient profiles 136 may also include preferences and/or dietary restrictions input by the recipient 102, such as: being a teetotaler (e.g., an individual who abstains from alcohol), being lactose intolerant, being glucose intolerant, being vegan, being vegetarian, does not like a specific restaurant (e.g., due to food quality, unfriendly staff, difficulty finding parking, etc.), does not eat seafood, does not eat sushi, does not like a specific type of food (e.g., Italian food, Chinese food, Indian food, etc.), etc. Such preferences and/or dietary restrictions are visible to the gifter 114 and may assist the gifter 114 to select the gift 108. In additional examples, if the gifter 114 selects the gift 108 that contradicts with one or more preferences and/or dietary restrictions of the recipient 102, the gifting engine 120 notifies the gifter 114 of such via a graphical notification (e.g., an image), a video notification, a textual notification (e.g., a text message notification or an email notification), an audio notification (e.g., a voicemail), and/or a tactile notification. In an illustrative example, the gifter 114 selects the gift 108 (e.g., an ice cream sundae) for the recipient 102. However, the profile of the recipient 102 indicates that the recipient 102 is lactose intolerant. The gifting engine 120 may then notify the gifter 114 via a textual notification of such intolerance (e.g., "The recipient 102 is lactose intolerant. Would you like to select another gift?") so that the gifter 114 may select another gift for the recipient 102.

The merchants (e.g., the merchant 110) may interact with the database 126 (e.g., to update/modify the merchant profile) and/or the gifting engine 120 via another computing device (not shown) daily, weekly, monthly, or yearly. In an illustrative example, the merchant 110 may be vigilant and may update/modify the merchant profile (e.g., the merchant profile A 134) daily such that food and/or beverage prices are updated based on a season, a holiday, or for promotion purposes. In this example, the gifter 114 may select a specific beverage (e.g., a pint of a local beer) as a gift 108 for a specific price (e.g., $8.45) set by the merchant 110. In another illustrative example, it may be cumbersome for the merchant 110 to update/modify the merchant profile (e.g., the merchant profile A 134) frequently. In this example, the merchant 110 may set the price for a beverage, such as a beer, at $8, which would allow the gifter 114 to gift a large majority (e.g., 75%) of the beer selections at the merchants establishment to the recipient 102 for this price. Moreover, in some examples, the merchant 110 may pay a fee to have the merchant profile (e.g., the merchant profile A 134) associated with and searchable via the gifting engine 120. Such fee may be a one-time fee, a monthly fee, a yearly fee, etc., which will be described further herein.

The gifting engine 120 may identify a gifter profile of the gifter profiles 132 associated with the login credentials 128. In response to such identification, the gifting engine 120 may validate the gifter 114 as an authorized user of the gifting engine 120. In other examples, the gifting engine 120 may fail to identify the gifter profile of the gifter profiles 132 associated with the login credentials 128 and may prompt the gifter 114 to create the gifter profile.

Next, the gifting engine 120 may receive, from the gifter 114 and via the GUI 118, an identity of the recipient 102 associated with the second computing device 104. The identity of the recipient 102 may include: a name of the recipient 102, an address of the recipient 102, an image of the recipient 102, a telephone number of the recipient 102, and/or a username of the recipient 102, among other identifying information. The gifting engine 120 may then query the database 126 again and may identify a recipient profile of the recipient profiles 136 based on the identity of the recipient 102 provided by the gifter 114. The recipient 102 may be validated as another authorized user of the gifting engine 120.

Then, the gifting engine 120 may identify a location (e.g., a first location 112) of the recipient 102. To do so, the gifting engine 120 may prompt the recipient 102 to grant the gifting engine 120 access to location-based tracking 106 of the second computing device 104. In response to receiving, by the gifting engine 120, the grant of the access to the location-based tracking 106 on the second computing device 104, the first location 112 of the recipient 102 is determined. Such location-based tracking 106 may include global positioning system (GPS) tracking.

In other examples, the recipient 102 may be reluctant to grant the gifting engine 120 access to location-based tracking 106 of the second computing device 104 due to privacy and/or security concerns. In this case, in response to receiving, by the gifting engine 120, a denial from the recipient 102 of the access to the location-based tracking 106 on the second computing device 104, the gifting engine 120 may prompt the recipient 102 to manually check-in one at the merchants establishment. Such manual check-in may occur by the recipient 102 engaging with the gifting engine 120. In other examples, such manual check-in may occur by the recipient 102 scanning a code (such as a QR code) at the merchants establishment. The code may be present in numerous locations at the merchants establishment (e.g., on a menu, at an entrance, on a table, etc.). Once the recipient 102 manually checks-in, the gifting engine 120 will be notified and will receive the first location 112 of the recipient 102.

Next, the gifting engine 120 compares the location (e.g., the first location 112) of the recipient 102 to locations associated with each of the merchant profiles 130 in the database 126. The gifting engine 120 may identify a match between the first location 112 of the recipient 102 and a location of the merchant profile A 134 of the merchant profiles 130. As shown in FIG. 2, the first location 112 is the location of the merchant 110 (e.g., Jane's Bakery) and the location of the recipient 102—at 10 South Lane, Derry, Maine. 99999.

Then, the gifting engine 120 may provide, via the GUI 118 on the first computing device 116, the gifter 114 with a listing of services 124 and/or products 122 associated with the merchant profile A 134 and offered by the merchant 110 (e.g., Jane's Bakery). The gifter 114 may filter the listing of the services 124 and/or the products 122 associated with the merchant profile A 134 based on keyword search, price point for the product or service, most commonly gifted items, etc. As shown in FIG. 2, the services 124 for Jane's Bakery (e.g., the merchant 110) may include cooking classes or catering classes. The products 122 for Jane's Bakery (e.g., the merchant 110) may include pastries, cupcakes, brownies, bagels, bread, etc. It should be appreciated that these examples are provided for illustrative purposes only and other examples are contemplated.

The gifter 114 may select the gift 108 from the listing of services 124 and/or products 122 associated with the merchant profile A 134 via the GUI 118 of the first computing device 116. The gifter 114 may be prompted to provide a payment via the gifting engine 120 for such gift 108. The payment may be taken and processed in any traditional method or system. Next, the gift 108 is provided to the recipient 102 while the recipient 102 is physically present at the first location 112.

Thus, as has been described, the gifter 114 may wish to utilize the gifting engine 120 to send the recipient 102 the gift 108 for numerous reasons. For example, the gifter 114 may wish to surprise a friend (e.g., the recipient 102) with a beer while the friend is out at a local tavern (e.g., the merchant 110). As another example, the gifter 114 may wish to surprise a spouse (e.g., the recipient 102) with a bottle of wine while the spouse is out at an upscale restaurant (e.g., the merchant 110). As a further example, the gifter 114 may wish to surprise a family member (e.g., the recipient 102) with a congratulatory dessert for a promotion while the family is at a restaurant (e.g., the merchant 110). In another example, the gifter 114 (e.g., a father) may wish to send a bottle of champagne to his daughter and son-in-law (e.g., the recipient 102) while the daughter and son-in-law are enjoying an anniversary dinner at a restaurant (e.g., the merchant 110). In a further example, the gifter 114 may buy a drink, dessert, or an appetizer for every individual in an establishment (e.g., at the merchant 110) who is identified as an authorized user of the gifting engine 120. It should be appreciated that these examples are provided for illustrative purposes only and other examples are contemplated by Applicant.

In some examples, the gift 108 is a physical object or gift, such as a bottle of wine, a glass of beer, a dessert, an appetizer, a gift basket, etc. In other examples, the gift 108 is a gift code provided via another GUI of the second computing device 104 and redeemable by the recipient 102 when the recipient 102 is physically present at the location (e.g., the first location 112). The gift code may take any form, such as a QR code, a numerical code, and/or an alphanumeric code, among others. In some examples, the gift code is tied to a specific merchant (e.g., Joe's Bakery). In other examples, the gift code may be redeemable at numerous merchant locations (e.g., Joe's Bakery, The Dog House Pub, Kary's Pet Grooming, etc.). In a further example, the gifter 114 may have the option to associate the gift code with a specific merchant (e.g., Joe's Bakery) or to associate the gift code with numerous merchant locations (e.g., Joe's Bakery or Kary's Pet Grooming).

In some embodiments, the gifting engine 120 may comprise a suggested gift feature. Such feature is ideal for the gifter 114 that does not know what specific preferences the recipient 102 may have. For example, the gifter 114 may utilize the suggested gift feature to send a suggested gift (e.g., the gift 108) to the recipient 102 for a particular merchant location. As a first illustrative example, the gifter 114 may select a milkshake as the gift 108 for Jay's Ice Cream Shop (e.g., the merchant 110). When the recipient 102 goes to the merchant 110, the recipient 102 may redeem the milkshake. If the recipient 102 wants something more expensive at Jay's Ice Cream Shop (e.g., the merchant 110) than the milkshake purchased by the gifter 114, the recipient 102 may pay the difference. As a second illustrative example, the gifter 114 may select a suggested gift of the milkshake costing $6 for Jay's Ice Cream Shop (e.g., the merchant 110). In this illustrative example, the recipient 102 may receive a $6 credit on the gifting engine 120. The recipient 102 may then go to Jay's Ice Cream Shop (e.g., the merchant 110) to redeem the suggested gift. In another example, the recipient 102 can use all or a portion of the $6 gift on something else at Jay's Ice Cream Shop (e.g., the merchant 110). In a further example, the recipient 102 can use all or a portion of the $6 gift on something else at another merchant location. In some examples, the other merchant location is in the same state as Jay's Ice Cream Shop (e.g., the merchant 110). In other examples, the other merchant location is in a different state from the state that Jay's Ice Cream Shop is in.

Optionally, the gifting engine 120 may be configured to prompt the gifter 114 to provide a textual message with the gift 108 or attach an e-card to the gift 108. The e-card may include text, audio, graphics, and/or video. The textual message may be received directly from an individual gifter, from multiple gifters associated with a closed group gift, or from multiple gifters associated with an open group gift.

In the example where the gift 108 is the open group gift, the gifting engine 120 may prompt an organizer of the gift 108 to set parameters for the textual message. For example, the organizer may specify that any individual for the open group gift may leave his/her name for the recipient 102 if the individual contributes a specific monetary amount (e.g., $1) to the gift 108. In other examples, if the individual leaves a greater monetary amount (e.g., at least $5) for the gift 108, the individual may leave a personal message for the recipient 102.

In response, the recipient 102 may receive the message or the e-card accompanying the gift 108. In other examples, the recipient 102 may be provided with a notification via the other GUI of the second computing device 104 regarding the gift and the gifter 114. In further examples, the notification may be a graphical notification (e.g., an image), a video notification, a textual notification (e.g., a text message notification or an email notification), an audio notification (e.g., a voicemail), and/or a tactile notification (e.g., a vibration of the second computing device 104).

In further examples, the first computing device 116 may also include the social media engine 138. In this example, and as depicted in FIG. 3, the gifter 114 may comprise two or more individuals (e.g., a first individual 140 and a second individual 142) and the gift 108 is a group gift for the recipient 102. Group gifting may be used to surprise the recipient 102 for a special event. For example, a group of employees may utilize group gifting to surprise the recipient 102 (e.g., another employee) for a promotion that the recipient 102 (e.g., the other employee) received. In this example, a notification may be provided to one or more mutual social media contacts via the social media engine 138 regarding the group gift for the recipient 102. The one or more mutual social media contacts may be prompted to contribute to the group gift. In other examples, the group gift may be a closed group gift that is only visible to a subset of the mutual social media contacts of the gifter 114. In another example, authorized users of the gifting engine 120 may receive a notification when the recipient 102 is present at a merchant location that utilizes or engages with the gifting engine 120.

It should be appreciated that the gift 108 may be sent in multiple ways to the recipient 102. For example, the gift 108 may be sent to the recipient 102 after the recipient 102 checks-in to the merchant establishment. In another example, the gift 108 may be a pooled gift sent by the gifter 114 that includes public individuals and individuals having a connection to the recipient 102. In a further example, the gift 108 may be a closed group gift sent by the gifter 114 that includes only a select group of individuals identified by an organizer of the gift 108.

In a further example, the gift 108 may be the gift code and may be sent to the recipient 102 before the recipient 102 checks-in to any merchant establishment. As such, in this example, the recipient's location need not coincide with merchant location associated with the gift 108. For example, if the recipient 102 is at a restaurant, the gifter 114 may transmit the gift 108 (e.g., a milkshake) to the recipient 102 that is associated with a merchant establishment (e.g., an ice cream shop) proximate the restaurant. The recipient 102 can redeem the gift 108 at the ice cream shop after the recipient 102 has finished eating at the restaurant, or, alternatively, may save the gift 108 for a later date.

In additional examples, the merchant 110 may promote one or more incentives on the merchant profile A 134 to prompt the gifter 114 to utilize the gifting engine 120 to purchase the gift 108 for the recipient 102. In an example, the merchant 110 may advertise on the merchant profile A 134 that if the gifter 114 utilizes the gifting engine 120 to purchase the gift 108 for the recipient 102 at the merchant location during the month of December, the gifter 114 may receive a code for a discount off their next purchase of one of the services 124 offered by the merchant 110 and/or one of the products 122 sold by the merchant 110. In some examples, this code may be generated in the first computing device 116 associated with the gifter 114.

In another example, the recipient 102 may receive the gift 108 from the gifter 114. In this illustrative example, the gift 108 is the gift code for a specific monetary amount (e.g., $100) for use at one or more merchant establishments. Assuming the recipient 102 utilizes a portion of the gift 108 (e.g., $50) at a first merchant establishment of the one or more merchant establishments, the gifting engine 120 may allow the recipient 102 to re-gift a remainder of the gift 108 (e.g., $50) to another recipient for use at the one or more merchant establishments.

In some implementations, the gifting engine 120 may be used for data collection purposes, where the data collected by the gifting engine 120 may be transmitted to the database 126, which may be accessed by a third-party. For example, through the gifting engine 120, the recipient 102 may be able to set preferences for their wants, likes, and dislikes. All of their check ins at various locations and purchases made would be saved. This information would be stored in the database 126. A third-party may access this information, with or without a fee of some sort, to help personalize an advertisement that may be shown within the gifting engine 120 to the recipient 102. The advertisement would assist with making recommendations to the recipient 102 and/or a friend or family member of the recipient 102 in the event that the friend or the family member was looking for a gift for the recipient 102. On the third-party or merchant side, most commonly purchased gifts may be viewable in the merchant profile A 134. These gifts may be used in the advertisement as recommendations to consumers (e.g., "Treat your friend to the most popular dish at ABC Seafood Restaurant.").

Further, as another example, if a given profile of the merchant profiles 130 indicates that certain trends are popular (e.g., people are gifting dishes at vegan restaurants), the gifting engine 120 may transmit a notification to the merchants to encourage the merchants to add vegan options to their menu to boost sales and encourage new business. The notification may be sent via any means known to those having ordinary skill in the art (e.g., text message, email, etc.) and may include text, graphics, audio, etc.

As such, any data entered in the gifting engine 120 (e.g., purchases made, gifts sent, sales trends, most popular items, etc.) is utilized to: make the gift 108 more personalized between users, help improve available options/sales of the merchant 110, and make any advertisement targeting consumers or other merchants more well pointed. This data collection also serves to improve the user experience on both the consumer and merchant end.

Figure 4:
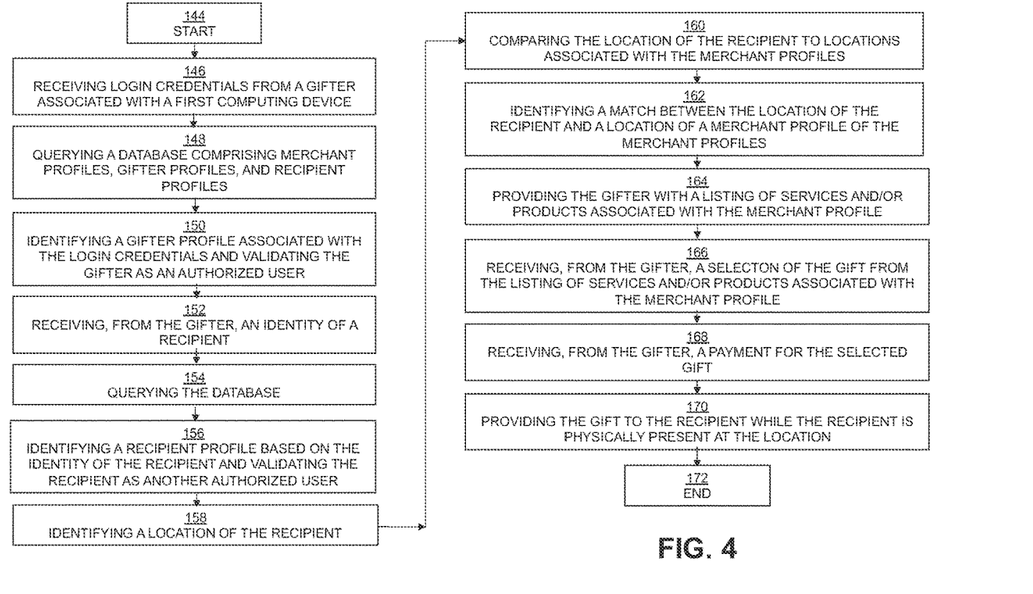
FIG. 4 depicts a block diagram of a method for providing a gift to a recipient at a merchant location, in accordance with embodiments of the present invention.

FIG. 4 depicts a block diagram of a method for providing a gift to a recipient at a merchant location. The method of FIG. 4 includes numerous process steps and begins at a process step 144. A process step 146 follows the process step 144 and includes: receiving, by the gifting engine 120, the login credentials 128 from the gifter 114 associated with the first computing device 116. A process step 148 follows the process step 146 and includes: querying, by the gifting engine 120, the database 126. A process step 150 follows the process step 148 and includes: identifying, via the gifting engine 120, a gifter profile of the gifter profiles 132 (on the database 126) associated with the login credentials 128 and validating the gifter 114 as the authorized user of the gifting engine 120.

A process step 152 follows the process step 150 and includes receiving, by the gifting engine 120 and from the gifter 114, the identity of the recipient 102. A process step 154 follows the process step 152 and includes: querying, by the gifting engine 120, the database 126. A process step 156 follows the process step 154 and includes: identifying, via the gifting engine 120, a recipient profile of the recipient profiles 136 (on the database 126) based on the identity of the recipient 102 and validating the recipient 102 as another authorized user of the gifting engine 120. A process step 158 follows the process step 156 and includes: identifying, via the gifting engine 120, the location (e.g., the first location 112) of the recipient 102.

A process step 160 follows the process step 158 and includes: comparing the first location 112 of the recipient 102 to locations associated with the merchant profiles 130 in the database. A process step 162 follows the process step 160 and includes: identifying, via the gifting engine 120, a match between the first location 112 of the recipient 102 and the location of the merchant profile A 134 of the merchant profiles 130. A process step 164 follows the process step 162 and includes: providing, via the gifting engine 120, the gifter 114 with a listing of the services 124 and/or the products 122 associated with the merchant profile A 134.

A process step 166 follows the process step 164 and includes: receiving, via the gifting engine 120, a selection of the gift 108 from the listing of the services 124 and/or the products 122 associated with the merchant profile A 134. A process step 168 follows the process step 166 and includes: receiving, by the gifting engine 120 and from the gifter 114, a payment for the selected gift 108. A process step 170 follows the process step 168 and includes: providing, via the gifting engine 120, the gift 108 to the recipient 102 while the recipient 102 is physically present at the first location 112. A process step 172 follows the process step 170 to conclude the method of FIG. 4.

In additional examples, the process steps of the method of FIG. 4 may be performed a subscription, advertising, and/or fee basis. That is, a service provider can offer to assist in the method steps of FIG. 4. In this case, the service provider can create, maintain, and/or support, etc. a computer infrastructure that performs the process steps. In return, the service provider can receive payment from the gifter 114 and/or the merchants of the merchant profiles 130 under a subscription and/or fee agreement, and/or the service provider can receive payment from the sale of advertising content to one or more third parties.

As such, in some examples, the gifters 114 associated with the gifter profiles 132, the recipients 102 associated with the recipient profiles 136, and/or the merchants 110 associated with the merchant profiles 130 may pay a subscription fee or a one-time fee to use the gifting engine 120 and/or to be searchable via the gifting engine 120. In other examples, the gifter 114 may pay a small percentage of the overall fee of the gift 108 when sending the gift 108 to the recipient 102 and/or the merchant 110 may pay a percentage of the overall fee of the gift 108 if the gift 108 is delivered at the merchants establishment. In other examples, the merchant 110 may pay a membership fee that is collected a weekly, a monthly, or a yearly basis.

Figure 5:
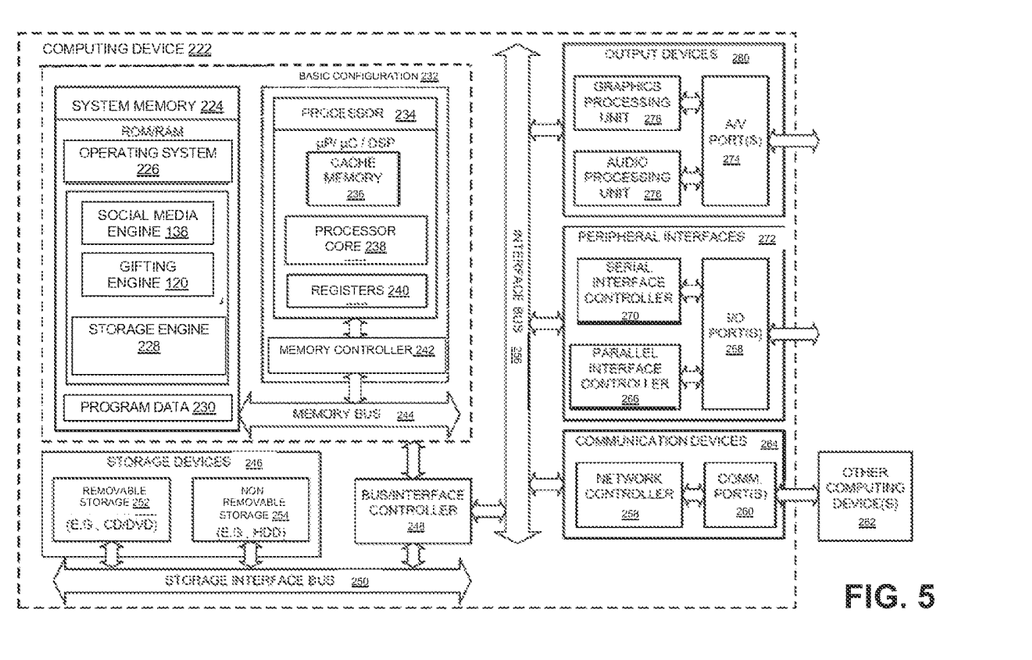
FIG. 5 is a block diagram of a computing device included within the computer system of FIG. 1 that is configured to implement a method for providing a gift to a recipient at a merchant location, in accordance with embodiments of the present invention.

FIG. 5 is a block diagram of a computing device included within the computer system of FIG. 1 that is configured to implement a method for providing a gift to a recipient at a merchant location. In some embodiments, the present invention may be a computer system, a method, and/or the computing device 116 (of FIG. 1) or the computing device 222 (of FIG. 5). For example, the computer system and/or the computing device 222 may be utilized to implement a method for providing a gift to a recipient at a merchant location.

A basic configuration 232 of a computing device 222 is illustrated in FIG. 5 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (μP), a microcontroller (μC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as the social media engine 138 and/or the gifting engine 120, and program data 230. In some embodiments, each of the social media engine 138 and/or the gifting engine 120 may be an application, a software program, a service, or a software platform, as described infra. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for providing a gift to a recipient at a merchant location, the method comprising:
    registering over a network with a database, via a recipient's computing device, a recipient to receive gifts from others:
    registering over the network with the database, via a gifter's computing device, a gifter, the recipient, and at least one merchant having an associated brick-and-mortar storefront address:
    receiving at a database, via a network, login credentials from a gifter associated with a first computing device;
    querying, by a server, a database comprising a plurality of merchant profiles, gifter profiles, and recipient profiles to identify a gifter profile from the plurality of gifter profiles associated with the received login credentials;
    validating the gifter as an authorized user of a gifting engine by confirming an association between the login credentials and the identified gifter profile, which enables the gifter's computing device to be notified when the recipient's computing device is at the brick-and-mortar storefront address as determined by location based tracking features of the recipient's computing device;
    receiving, from the gifter, an identity of a recipient associated with a second computing device;
    querying the database to identify a recipient profile from the plurality of recipient profiles based on the identity of the recipient;
    validating the recipient as another authorized user of the gifting engine by confirming an association between the identity provided by the gifter and the identified recipient profile;
    identifying a location of the recipient, via global positioning tracking, on the second computing device associated with the recipient;
    comparing, via the gifting engine, the location of the recipient to a location associated with each merchant profile in the plurality of merchant profiles, and identifying a match between the location of the recipient and a location of a merchant profile in the plurality of merchant profiles;
    upon validation of both the gifter and recipient, and identification of a match, receiving location data from the recipient's computing device via a location-based tracking application indicating proximity to a designated brick-and-mortar storefront address; and
    transmitting, to the gifter's computing device via the network, a notification of the recipient's proximity to the storefront address, wherein the notification enables the gifter to access merchant data comprising a set of products or services available for purchase at the brick-and-mortar merchant location;
    presenting, via a graphic user interface (GUI) of the gifter's computing device, the gifter with a listing of services or products offered by a merchant at the brick-and-mortar storefront address;
    receiving, from the gifter, a selection of a gift, which is a selected one of the services or products presented via the GUI;
    receiving, from the gifter, via the gifter's computing device a payment for the gift; and
    responsive to receiving the payment, providing the gift to the recipient while the recipient is physically present at the brick-and-mortar storefront;
    wherein each of the gifter's computing device and the recipient's computing device comprise a processor, a memory, an operating system, and a network transceiver.

2. The method of claim 1, wherein the merchant is selected from the group consisting of: a retail store, a sporting arena or stadium, and a concert.

3. The method of claim 1, wherein the gift is a physical object.

4. The method of claim 1, wherein the gift is a gift code redeemable by the recipient when the recipient is physically present at the brick and mortar storefront address.

5. The method of claim 4, wherein the gift code is associated with a specific merchant.

6. The method of claim 4, wherein the gift code is associated with a group of merchants.

7. The method of claim 1, wherein the current location of the recipient is identified via global positioning system (GPS) tracking on the recipient's computing device.

8. The method of claim 1, further comprising:
    prompting the gifter via the gifter's computing device to provide a message with the gift or attach an e-card to the gift; and
    receiving, at the recipient's computing device, the message or the e-card.

9. The method of claim 1, wherein the login credentials are selected from the group consisting of: a username, a password, and a biometric identification means, and wherein the biometric identification means is selected from the group consisting of: a fingerprint identification, a face recognition identification, a palm print identification, an iris recognition, and a retina recognition.

10. The method of claim 1, further comprising:
    providing a notification regarding the gift to the recipient via the recipient's computing device.

11. The method of claim 1, wherein the gifter's computing device further comprises a social media application through which the gift is selected and from which the payment is received.

12. The method of claim 1, wherein the gifter comprises two or more individuals, and wherein the gift is a group gift for the recipient.

13. The method of claim 11, further comprising:
    providing, via the social media application, a notification to one or more mutual social media contacts regarding a group gift for the recipient; and
    prompting, via the social media application, the one or more mutual social media contacts to contribute to the group gift, wherein the gift is the group gift.

* * * * *